US012522792B2

(12) United States Patent
Wu et al.

(10) Patent No.: US 12,522,792 B2
(45) Date of Patent: Jan. 13, 2026

(54) CELL CULTURE DEVICE

(71) Applicant: Industrial Technology Research Institute, Hsinchu (TW)

(72) Inventors: Li-An Wu, New Taipei (TW); Ting-Hsuan Chen, Hsinchu County (TW); Chih-Hung Lee, New Taipei (TW); Nien-Jen Chou, Hsinchu (TW); Kuo-Hsing Wen, Hsinchu County (TW); Wen-Ting Chiang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 625 days.

(21) Appl. No.: 18/089,570

(22) Filed: Dec. 28, 2022

(65) Prior Publication Data
US 2024/0218310 A1    Jul. 4, 2024

(51) Int. Cl.
*C12M 1/06*    (2006.01)
*C12M 1/00*    (2006.01)
(Continued)

(52) U.S. Cl.
CPC ............ *C12M 27/02* (2013.01); *C12M 23/16* (2013.01); *C12M 23/24* (2013.01); *C12M 23/38* (2013.01);
(Continued)

(58) Field of Classification Search
CPC ...... C12M 27/02; C12M 23/16; C12M 23/24; C12M 23/38; C12M 23/48; C12M 27/16;
(Continued)

(56) References Cited

U.S. PATENT DOCUMENTS 8,192,982 B2 * 6/2012 Hasegawa .............. C12M 41/14
73/864.22
9,255,243 B2   2/2016 Wilson et al.
(Continued)

FOREIGN PATENT DOCUMENTS

CN        110016437      7/2019
CN        114525205      5/2022
(Continued)

OTHER PUBLICATIONS

"Notice of allowance of Taiwan Counterpart Application", issued on Sep. 13, 2023, p. 1-p. 3.

*Primary Examiner* — Benjamin R Whatley
(74) *Attorney, Agent, or Firm* — JCIPRNET

(57) ABSTRACT

A cell culture device configured for activating, transducing, isolating and/or expanding cells. The cell culture device includes a mixing tank and a rotary control platform. The mixing tank includes a first support, a hollow tank and a cover. The hollow tank is disposed on the first support and has a first opening, a second opening and an accommodating space. The cover covers the second opening and has a first hole, an inlet end and an outlet end. The rotary control platform includes a base, a second support, a rotating gear, an inclination control member and a micro injector. The second support is disposed on the base. The rotating gear is fixed on the first support. The inclination control member has a first part, a second part and a third part. The first part is connected to the rotating gear, and the second part is connected to the first part and the third part. The micro injector extends to the accommodating space through the first hole of the cover. The micro injector has a top end and a bottom end, the top end is fixed on the third part, and the bottom end is disposed to a bottom of the accommodating (Continued)

space. The micro injector is inclined towards the bottom of the accommodating space.

9 Claims, 8 Drawing Sheets

(51) Int. Cl.
    *C12M 1/04*     (2006.01)
    *C12M 1/12*     (2006.01)
    *C12M 3/00*     (2006.01)
    *C12M 3/06*     (2006.01)
    *C12M 1/26*     (2006.01)
    *C12M 1/42*     (2006.01)

(52) U.S. Cl.
    CPC ............ *C12M 23/48* (2013.01); *C12M 27/16* (2013.01); *C12M 29/04* (2013.01); *C12M 37/04* (2013.01); *C12M 1/265* (2013.01); *C12M 33/04* (2013.01); *C12M 35/00* (2013.01)

(58) Field of Classification Search
    CPC ...... C12M 29/04; C12M 37/04; C12M 1/265; C12M 33/04; C12M 35/00
    See application file for complete search history.

(56) References Cited

U.S. PATENT DOCUMENTS

| | | | | |
|---|---|---|---|---|
| 2009/0298129 | A1* | 12/2009 | Spence | G01N 35/00732 901/30 |
| 2012/0115213 | A1* | 5/2012 | Hofstadler | C12Q 1/6806 422/68.1 |
| 2014/0377739 | A1* | 12/2014 | Welch | C12M 23/24 435/286.5 |
| 2022/0127556 | A1 | 4/2022 | Totani et al. | |
| 2022/0169985 | A1 | 6/2022 | Chen et al. | |
| 2024/0326035 | A1* | 10/2024 | Juang | B01L 3/0227 |

FOREIGN PATENT DOCUMENTS

| | | |
|---|---|---|
| CN | 115093969 | 9/2022 |
| TW | 200526775 | 8/2005 |
| WO | 2021090767 | 5/2021 |

\* cited by examiner

CELL CULTURE DEVICE

TECHNICAL FIELD

The disclosure relates to a cell culture device, and in particular relates to a cell culture device that may provide an effect similar to manual operation, reduce errors in manual operation, or improve the stability of cell products.

BACKGROUND

The production of CAR-T cells requires steps such as cell purification, cell activation, cell transduction, magnetic bead isolation, and cell expansion. During the CAR-T cell production process, the uniformity of the virus in the culture environment and the dispersion of cells and magnetic beads greatly affect the expression and expansion of the cultured CAR-T cells. However, when the complex CAR-T cell production process is generally carried out manually, it is easy to cause the risk of cell contamination, and it is easy to cause differences in the expression and expansion of batches of cells due to errors in manual operations by different technical staff.

SUMMARY

The present invention provides a cell culture device, which may provide an effect similar to manual operation, reduce errors in manual operation, or improve the stability of cell products.

The cell culture device of the present invention is configured for activating, transducing, isolating, and/or expanding cells. The cell culture device includes a mixing tank and a rotary control platform. The mixing tank includes a first support, a hollow tank, a cover, a first pipeline, and a second pipeline. The hollow tank is disposed on the first support and has a first opening, a second opening, and an accommodating space. The cover covers the second opening and has a first hole, an inlet end, and an outlet end. The rotary control platform includes a base, a second support, a rotating gear, an inclination control member, and a micro injector. The second support is disposed on the base. The rotating gear is fixed on the second support. The inclination control member has a first part, a second part, and a third part. The first part is connected to the rotating gear, and the second part is connected to the first part and the third part. The micro injector extends to the accommodating space through the first hole of the cover. The micro injector has a top end and a bottom end, the top end is fixed on the third part, and the bottom end is adjacent to a bottom of the accommodation space. The micro injector is inclined towards the bottom of the accommodating space.

In an embodiment of the present invention, the first support has a support member and a gas-permeable film. The support member has a plurality of micropores arranged in an array. The gas-permeable film is disposed between the hollow tank and the support member. The gas-permeable film covers the first opening of the hollow tank.

In an embodiment of the present invention, the gas-permeable film has pores with diameter of 0.1 micron (micrometer, μm) to 0.3 micron. A thickness of the gas-permeable film is 50 microns to 500 microns.

In an embodiment of the present invention, a number of the plurality of micropores is 40 to 60. The plurality of micropores have pores with diameter of 1 mm to 2 mm.

In an embodiment of the present invention, the mixing tank further includes a first pipeline, a second pipeline, a silicone sheet, a first sealing member, and a second sealing member. The first pipeline is connected to the inlet end and extends to a top of the accommodating space. The second pipeline is connected to the outlet end and extends to the bottom of the accommodation space. The silicone sheet is disposed between the cover and the hollow tank. The silicone sheet covers the second opening and has a second hole. The first sealing member is disposed at a joint between the hollow tank and the first support. The second sealing member is disposed at a joint between the cover and the hollow tank. The micro injector extends to the accommodating space through the second hole of the silicone sheet.

In an embodiment of the present invention, a rotation angle of the rotating gear is 0° to 360°.

In an embodiment of the present invention, the rotary control platform further includes a motor and a pump. The motor is disposed on the second support and drives the rotating gear. The pump has a third pipeline. The third pipeline is connected to the top of the micro injector through the third part of the inclination control member.

In an embodiment of the present invention, an inclination angle between an extending direction of the micro injector and a horizontal surface of the first support is 30° to 85°.

In an embodiment of the present invention, a first width of the top end of the micro injector is larger than a second width of the bottom end of the micro injector.

In an embodiment of the present invention, a ratio of the first width to the second width is 5:1 to 8:1.

Based on the above, in the cell culture device of an embodiment of the present invention, through the design of the rotating gear, the inclination control member, and the micro injector, an effect similar to manual operation may be provided to suck and eject the medium at different positions in the hollow tank, so that different materials in the medium (e.g., cells, magnetic beads, and/or virus) may be uniformly mixed, and cell clusters in the medium (e.g., the cell clusters formed by the close attachment of cells and magnetic beads) may be broken up. Since different materials (e.g., cells, magnetic beads, and/or virus) in the medium may be uniformly mixed, the effect of cell activation and/or cell transduction may be improved. Since the cell clusters in the medium (e.g., the cell clusters formed by the close attachment of cells and magnetic beads) may be broken up, it is possible to avoid damage or loss of cells in the subsequent step of removing the magnetic beads that reduces cell viability and/or cell expansion factor. In addition, since the cell culture device of this embodiment may be a closed device, the risk of contamination may be reduced. Since the cell culture device of this embodiment may be an automated device, it may replace manual operations, thereby reducing errors in manual operations or improving the stability of cell products.

In order to make the above-mentioned features and advantages of the disclosure comprehensible, embodiments accompanied with drawings are described in detail below.

DETAILED DESCRIPTION OF DISCLOSED EMBODIMENTS

Figure 1:
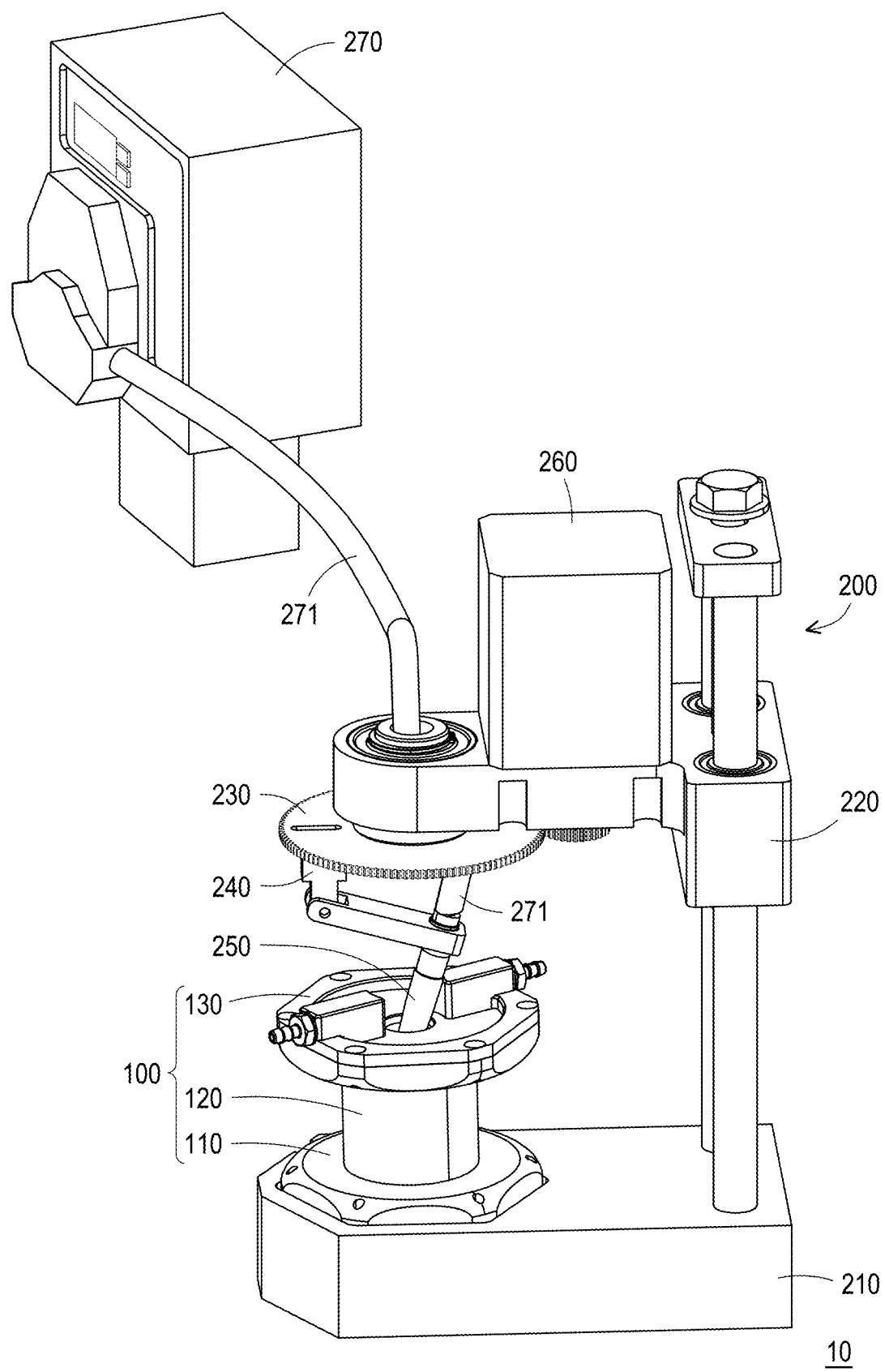
FIG. 1 is a three-dimensional schematic view of a cell culture device according to an embodiment of the present invention.
Figure 2:
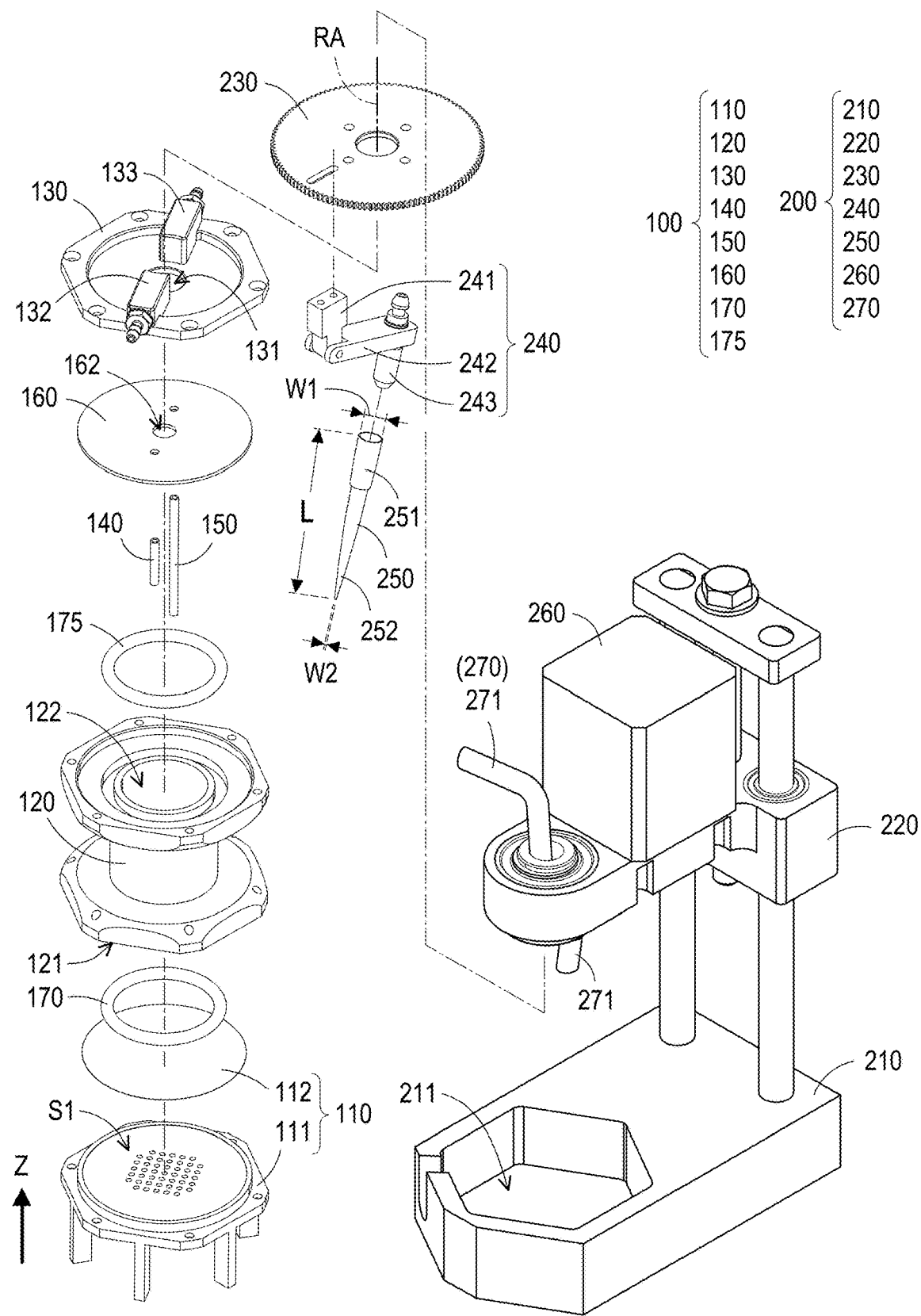
FIG. 2 is a partial exploded schematic view of the cell culture device in FIG. 1.
Figure 3:
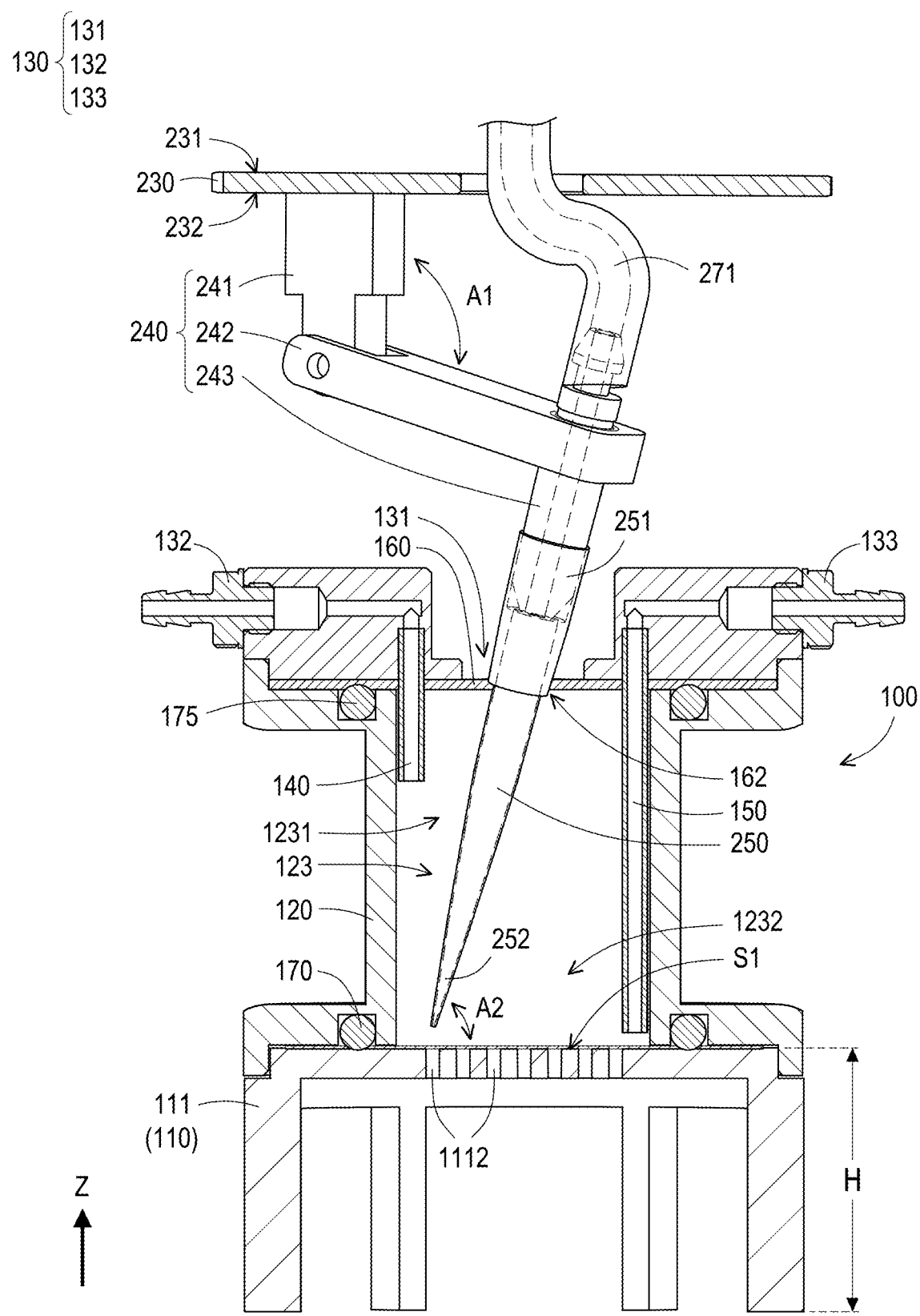
FIG. 3 is a partial cross-sectional schematic view of the cell culture device in FIG. 1.
Figure 4:
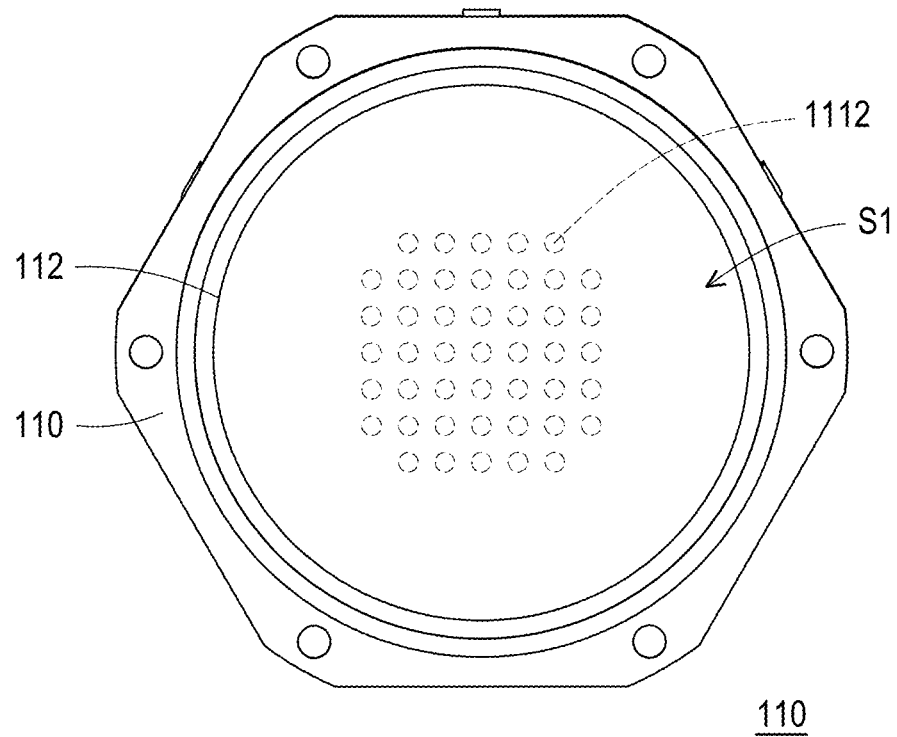
FIG. 4 is a top schematic view of a first support in the cell culture device of FIG. 1.

FIG. 1 is a three-dimensional schematic view of a cell culture device according to an embodiment of the present invention. FIG. 2 is a partial exploded schematic view of the cell culture device in FIG. 1. FIG. 3 is a partial cross-sectional schematic view of the cell culture device in FIG. 1. FIG. 4 is a top schematic view of a first support in the cell culture device of FIG. 1. For clarity and convenience of illustration, some elements of the first support are omitted in FIG. 4.

Referring to FIG. 1 to FIG. 4, the cell culture device 10 of this embodiment may be used for cell activation, cell transduction, cell isolation, and/or cell expansion, but not limited thereto. The cell culture device 10 of this embodiment may be a closed device to reduce the risk of contamination. The cell culture device 10 of this embodiment may be an automated device to replace manual operations, thereby reducing errors in manual operations or improving the stability of cell products.

In some embodiments, the cell culture device 10 includes a mixing tank 100 and a rotary control platform 200. The mixing tank 100 is disposed on the rotary control platform 200. The mixing tank 100 includes a first support 110, a hollow tank 120, a cover 130, a first pipeline 140, a second pipeline 150, a silicone sheet 160, a first sealing member 170, and a second sealing member 175. The rotary control platform 200 includes a base 210, a second support 220, a rotating gear 230, an inclination control member 240, a micro injector 250, a motor 260, and a pump 270.

In detail, the first support 110 has a support member 111 and a gas-permeable film 112. The support member 111 is disposed in the groove 211 of the base 210 so that the first support 110 may be fixed on the base 210. The surface of the support member 111 (i.e., the horizontal surface S1 of the first support 110) may provide a sufficient support plane for cells to grow. The ratio of the diameter of the horizontal surface S1 of the first support 110 to the height H of the first support 110 may be, for example, 1:1, 1.5:1, 2:1, 2.5:1, or 3:1, but not limited thereto. For example, the diameter of the horizontal surface S1 of the first support 110 may be 25 millimeters (mm), and the height H of the first support 110 may be 25 mm, but not limited thereto. In some embodiments, the diameter and height H of the horizontal surface S1 of the first support 110 may also respectively be 37.5 mm and 25 mm, 50 mm and 25 mm, 62.5 mm and 25 mm, or 75 mm and 25 mm. The support member 111 has multiple micropores 1112 arranged in an array, so that air may exchange autonomously inside and outside the accommodating space 123 of the hollow tank 120 through the micropores 1112. In some embodiments, the number of micropores 1112 may be, for example, 40 to 60, 45 to 55, or 50, etc., but not limited thereto. The micropores 1112 may have pores with diameter of, for example, 1 mm to 2 mm, 1.2 mm to 1.8 mm, or 1.5 mm, etc., but not limited thereto. The total area of all micropores 1112 may be, for example, from 30 millimeters squared ($mm^2$) to 140 millimeters squared, from 50 millimeters squared to 120 millimeters squared, from 50 millimeters squared to 80 millimeters squared, from 60 millimeters squared to 100 millimeters squared, or from 70 millimeters squared to 95 millimeters squared, etc., but not limited thereto. In some embodiments, the number of micropores is 45, the pore diameter of the micropores is 1.6 mm, and the total area of all the micropores is 90.5 millimeters squared ($mm^2$).

The gas-permeable film 112 is disposed on the support member 111 and disposed between the hollow tank 120 and the support member 111. The gas-permeable film 112 may cover the micropores 1112 and the first opening 121 of the hollow tank 120. The gas-permeable film 112 is hydrophobic, so that the medium in the accommodating space 123 does not flow out from the gas-permeable film 112. The gas-permeable film 112 also has breathable properties, so that air in the accommodating space 123 may exchange autonomously with the external environment through the gas-permeable film 112 and the micropores 1112, thereby the accommodating space 123 may be maintained in an oxygen-enriched environment.

In some embodiments, the gas-permeable film 112 may be, for example, a micron-scale hydrophobic gas-permeable film. The thickness of the gas-permeable film 112 may be, for example, 50 microns to 500 microns, 75 microns to 450 microns, 100 microns to 400 microns, 100 microns to 200 microns, 150 microns to 350 microns, 200 microns to 300 microns, 125 microns, 175 microns, 220 microns, or 250 micron, etc., but not limited thereto. The gas-permeable film 112 may have pores with diameter of, for example, 0.1 microns to 0.3 microns, 0.15 microns to 0.27 microns, 0.18 microns to 0.25 microns, 0.2 microns, or 0.23 microns, but not limited thereto. In some embodiments, the material of the gas-permeable film 112 may include, for example, polytetrafluoroethylene (PTFE) or other film materials with hydrophobic and breathable properties, but not limited thereto.

The hollow tank 120 is disposed on the first support 110. The hollow tank 120 has a first opening 121, a second opening 122, and an accommodating space 123. The first opening 121 and the second opening 122 are opposite to each other, and the accommodating space 123 is connected to the first opening 121 and the second opening 122. The first opening 121, the second opening 122, and the accommodating space 123 may overlap each other in the normal direction Z of the cell culture device 10. In some embodiments, the volume that the hollow tank 120 may accommodate is, for example, 5 milliliters (mL) to 15 milliliters, 20 milliliters to 50 milliliters, 400 milliliters to 1 liter (L), etc., but not limited thereto. In some embodiments, the volume that the hollow tank may accommodate may also be about 500 milliliters or 1000 milliliters.

The cover 130 is disposed on the hollow body 120, and the cover 130 may cover the second opening 122. The cover 130 has a first hole 131, an inlet end 132, and an outlet end 133.

The first hole 131 may overlap the second opening 122 of the hollow tank 120 in the normal direction Z of the cell culture device 10. The inlet end 132 and the outlet end 133 are opposite to each other. In this embodiment, the cells, magnetic beads, virus and/or culture medium required for cell cultivation may enter the accommodating space 123 of the hollow tank 120 through the inlet end 132, and the magnetic beads, virus, and/or culture medium used in cell cultivation may be discharged through the outlet end 133.

The first pipeline 140 is connected to the inlet end 132 and extends to the top 1231 of the accommodating space 123, so as to input the cells, magnetic beads, virus, and/or culture medium entering the inlet end 132 into the accommodating space 123.

The second pipeline 150 is connected to the outlet end 133 and extends to the bottom 1232 of the accommodating space 123, so that the used magnetic beads, virus, and/or culture medium in the accommodating space 123 are output from the accommodating space 123.

The silicone sheet 160 is disposed between the cover 130 and the hollow tank 120. The silicone sheet 160 may cover the second opening 122, and the silicone sheet 160 has a second hole 162. The second hole 162 may overlap the first hole 131 of the cover 130 and the second opening 122 of the hollow tank 120 in the normal direction Z of the cell culture device 10. The silicone sheet 160 may be close together with the micro injector 250, so when the micro injector 250 rotates, the problem of medium evaporating from the second hole 162 may be reduced.

The first sealing member 170 is disposed at the joint between the hollow tank 120 and the first support 110 to prevent the medium in the hollow tank 120 from flowing out from the joint. The first sealing member 170 may be, for example, an O-ring, but not limited thereto.

The second sealing member 175 is disposed at the joint between the cover 130 and the hollow tank 120 to prevent the medium in the hollow tank 120 from flowing out or evaporating from the joint. The second sealing member 175 may be, for example, an O-ring, but not limited thereto.

The second support 220 is disposed on the base 210 and fixed on the base 210.

The rotating gear 230 is disposed above the base 210, and the first side 231 of the rotating gear 230 may be fixed on the second support 220. The second side 232 of the rotating gear 230 is opposite to the first side 231, and the second side 232 of the rotating gear 230 faces the mixing tank 100.

The rotating gear 230 has a rotation axis RA, and the rotating gear 230 may rotate according to the rotation axis RA. The rotation axis RA may be substantially parallel to the normal direction Z of the cell culture device 10. The rotation angle of the rotating gear 230 may be 0° to 360°, such as 30°, 60°, 90°, 120°, 150°, or 180°, etc., but not limited thereto.

The inclination control member 240 is fixed on the second side 232 of the rotating gear 230, and the inclination control member 240 is disposed between the rotating gear 230 and the mixing tank 100. The inclination control member 240 has a first part 241, a second part 242, and a third part 243. The first part 241 is respectively connected to the second side 232 of the rotating gear 230 and the second part 242. There is an adjustable first angle A1 between the first part 241 and the second part 242. The second part 242 is respectively connected to the first part 241 and the third part 243. The third part 243 is respectively connected to the second part 242 and the micro injector 250.

The micro injector 250 is connected to the third part 243 of the inclination control member 240 and extends to the bottom 1232 of the accommodating space 123 through the first hole 131 of the cover 130 and the second hole 162 of the silicone sheet 160. The micro injector 250 has a top end 251 and a bottom end 252. The top end 251 is connected and fixed to the third part 243 of the inclination control member 240, and the bottom end 252 is disposed at the bottom 1232 of the accommodating space 123. In addition, the micro injector 250 is a hollow structure, so that medium may pass through the micro injector 250.

In this embodiment, since the two ends of the inclination control member 240 are respectively connected to the rotating gear 230 and the micro injector 250, when the rotating gear 230 rotates, the inclination control member 240 and the micro injector 250 rotate accordingly, thereby changing the position of the bottom end 252 of the micro injector 250 at the bottom 1232 of the accommodating space 123.

In this embodiment, the micro injector 250 may be inclined towards the bottom 1232 of the accommodating space 123, so that there is an inclination angle A2 between the extending direction of the micro injectors 250 and the horizontal surface S1 of the first support 110. In this embodiment, the inclination angle A2 between the extending direction of the micro injector 250 and the horizontal surface S1 of the first support 110 may be 30° to 85°, for example, 35° to 80°, 40° to 75°, 45° to 70°, 50° to 65°, or 55° to 60°, but not limited thereto. In addition, in this embodiment, the sum of the first angle A1 and the inclination angle A2 may be, for example, 180°, but not limited thereto. For example, when the first angle is 105°, the inclination angle is 75°.

In this embodiment, the top end 251 and the bottom end 252 of the micro injector 250 respectively have a first width W1 and a second width W2. The first width W1 of the top end 251 may, for example, be greater than the second width W2 of the bottom end 252 of the micro injector 250, and the ratio of the first width W1 to the second width W2 may be, for example, 5:1 to 8:1, 5.5:1, 6:1, 6.5:1, 7:1, 7.5:1, or 8:1, etc., but not limited thereto. Compared with the configuration with the same width at the top and bottom, this configuration with a wide top and a narrow bottom may allow the micro injector to generate a larger flow rate when sucking and ejecting medium to improve the medium stirring, such that the medium have a stronger shear force, thereby improving the effect of uniform mixing and uniform dispersion (e.g., the cells and magnetic beads in the medium may be uniformly mixed or uniformly dispersed), but not limited thereto. For example, the first width W1 may be 4.8 mm, and the second width W2 may be 0.8 mm. In addition, in this embodiment, the length L of the micro injector 250 may be, for example, 50 mm, but not limited thereto. The shape of the micro injector 250 may be, for example, conical, but not limited thereto.

The motor 260 is disposed on the second support 220. The motor 260 may be used to drive the rotating gear 230 to rotate. In this embodiment, the motor 260 may be, for example, a gear motor, so that the gear on the gear motor drives the rotating gear 230 to rotate, but not limited thereto.

The pump 270 has a third pipeline 271. The third pipeline 271 of the pump 270 may be connected to the third part 243 of the inclination control member 240, and the third pipeline 271 of the pump 270 may be connected to the top end 251 of the micro injector 250 through the third part 243 of the inclination control member 240. In this embodiment, the pump 270 may push back and forth (or suck and eject) the medium in the hollow tank 120 through the disposition of the third pipeline 271, the third part 243 of the inclination control member 240, and the micro injector 250, so that the medium in the hollow tank 120 may be stirred such that the cells, magnetic beads, and/or virus in the medium may be uniformly mixed or uniformly dispersed. For example, when the magnetic beads are added to the medium that contains cells in the hollow tank 120, the pump 270 may push the medium back and forth (or suck and eject the medium), so that the cells and the magnetic beads may be uniformly mixed. When the magnetic beads in the hollow tank 120 are closely attached to the cells due to their high adhesiveness and form a cluster, the pump 270 may push the medium back and forth (or suck and eject the medium) to break up the cluster to avoid damage or loss of cells in the subsequent step of removing magnetic beads, and even affect the subsequent growth of cells.

In this embodiment, since the rotating gear 230 may adjust the rotation angle of the micro injector 250 and the position of the bottom end 252 of the micro injector 250 at the bottom 1232 of the accommodating space 123 through rotation, therefore, by changing the rotation angle of the micro injector 250 and the position of the bottom end 252 of the micro injector 250 at the bottom 1232 of the accommodating space 123, the range of medium stirring may be increased to the entire accommodating space 123 (as shown in FIG. 6A to FIG. 6D).

In this embodiment, since the first angle A1 between the first part 241 and the second part 242 of the inclination control member 240 is adjustable, and the angle between the second part 242 and the third part 243 is fixed, the inclination angle A2 of the micro injector 250 may be adjusted by changing the dimension of the first angle A1. In this embodiment, adjusting the inclination angle A2 of the micro injector 250 through the inclination control member 240 may be performed to change the position of the bottom end 252 of the micro injector 250 at the bottom 1232 of the accommodating space 123, thereby improving the range of medium stirring and the effect of mixing.

Hereinafter, the operation method of the cell culture device 10 of the aforementioned embodiment is described in detail by using experimental examples. However, the following experimental examples are not intended to limit the present invention.

In the following, CAR-T cells are respectively produced by an automated cell culture device and a general manual method. The production of CAR-T cells requires steps such as cell purification, cell activation, cell transduction, magnetic bead isolation, and cell expansion. Since the uniformity of the virus in the culture environment is related to the probability that the virus may contact the cells, therefore, by uniformly mixing the virus and the cells, the contact probability between the virus and the cells may be increased, thereby the transduction efficiency may be improved. In addition, since cells and magnetic beads are closely attached to form cell clusters during the cell activation process, if the magnetic beads are forcibly removed during the isolation process of magnetic beads, it will cause damage or loss of cells, thereby reducing the viability of cells or the factor that cells may be expanded.

Experimental Example 1: Using the Automated Cell Culture Device of the Present Invention to Produce CAR-T Cells (Example)

Step 1: Cell activation: the T cell solution (about $10^6$ cells) extracted from the blood and the magnetic beads modified with CD3 and CD28 are added into the hollow tank of the cell culture device of the present invention and let stand for 24 hours.

Step 2: Cell transduction: after injecting lentivirus into the hollow tank from the inlet end, the pump is turned on, and with a flow rate of 10 mL/min and a flow amount of 2 mL, the medium in the hollow tank is sucked and ejected twice. Next, after rotating the rotating gear 180°, the action of sucking and ejecting twice at the same flow rate and flow amount as above is performed again. After finishing, let it stand for 48 hours.

Figure 5A:
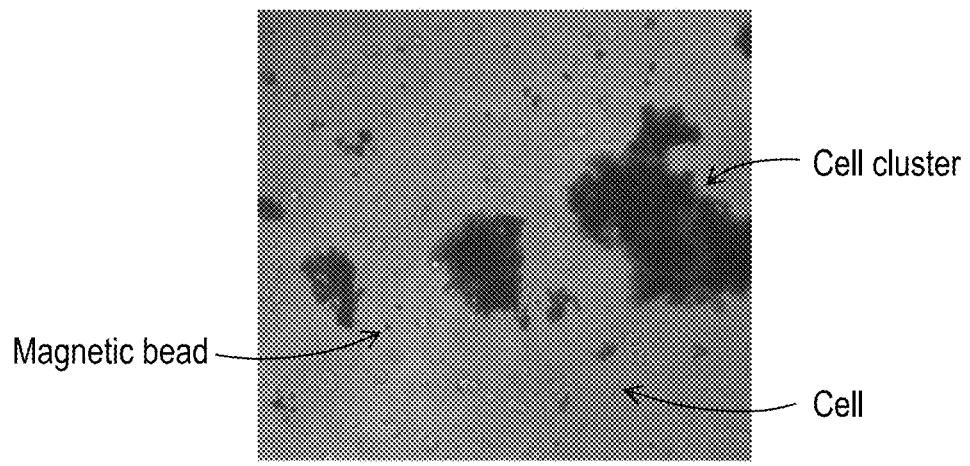
FIG. 5A is a photo taken with an optical microscope of cells after transduction.

Next, the situation after the cell transduction is observed with an optical microscope and photographed, and the result is shown in FIG. 5A. It may be seen from the result in FIG. 5A that during the cell transduction process, the cells and the magnetic beads are closely attached to form cell clusters.

Figure 6A:
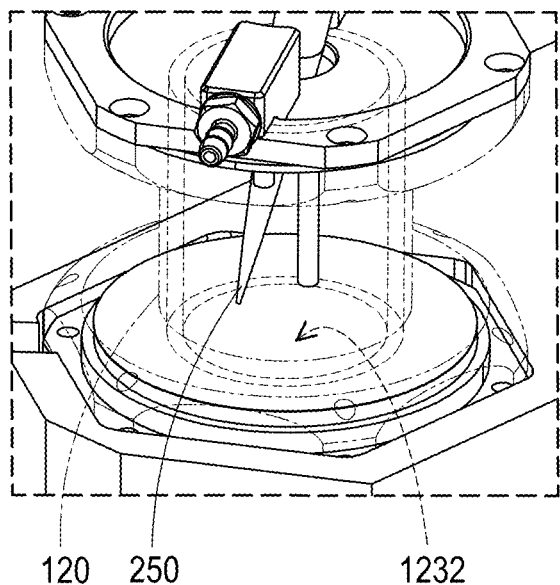
FIG. 6A to FIG. 6D respectively show the situations in which the micro injector is sucking and ejecting at different positions in the accommodating space.

Step 3: The cell clusters formed by the close attachment of cells and magnetic beads are broken up: the pump is turned on, and the medium in the hollow tank is sucked and ejected 5 times at a flow rate of 40 mL/min and a flow amount of 2 mL, as shown in FIG. 6A.

Figure 6B:
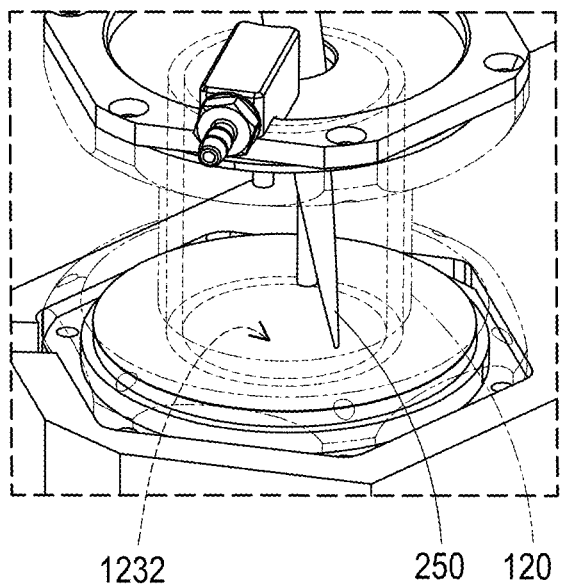

Step 4: After rotating the rotating gear 180°, the action of sucking and ejecting 5 times at the same flow rate and flow amount as in Step 3 is performed again, as shown in FIG. 6B.

Figure 6C:
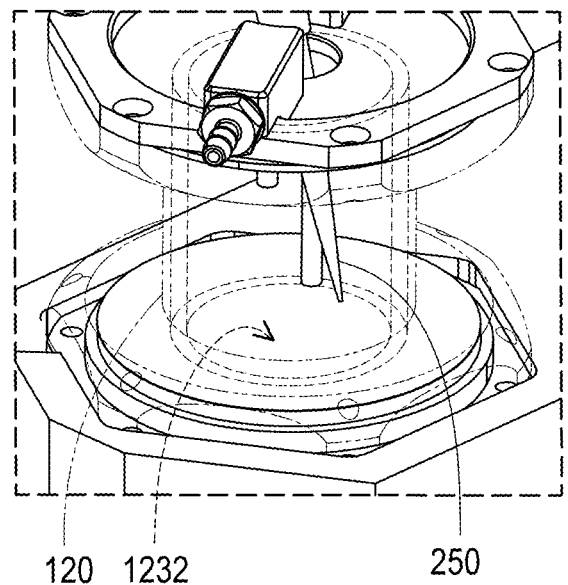

Step 5: After rotating the rotating gear 90°, the action of sucking and ejecting 5 times at the same flow rate and flow amount as in Step 3 is performed again, as shown in FIG. 6C.

Figure 6D:
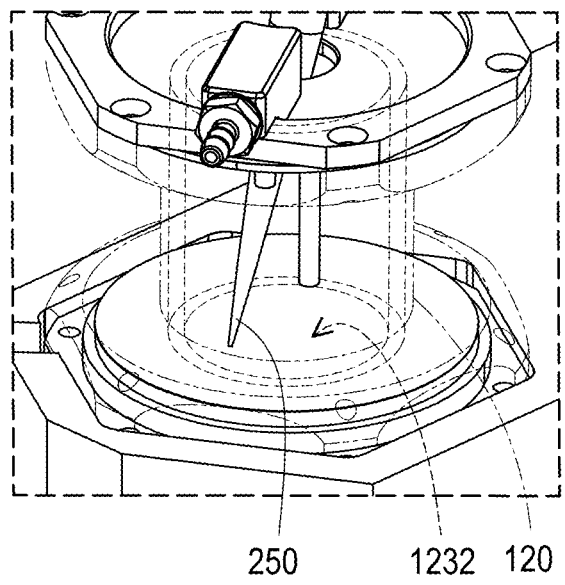

Step 6: After rotating the rotating gear 180°, the action of sucking and ejecting 5 times at the same flow rate and flow amount as in Step 3 is performed again, as shown in FIG. 6D.

Figure 5B:
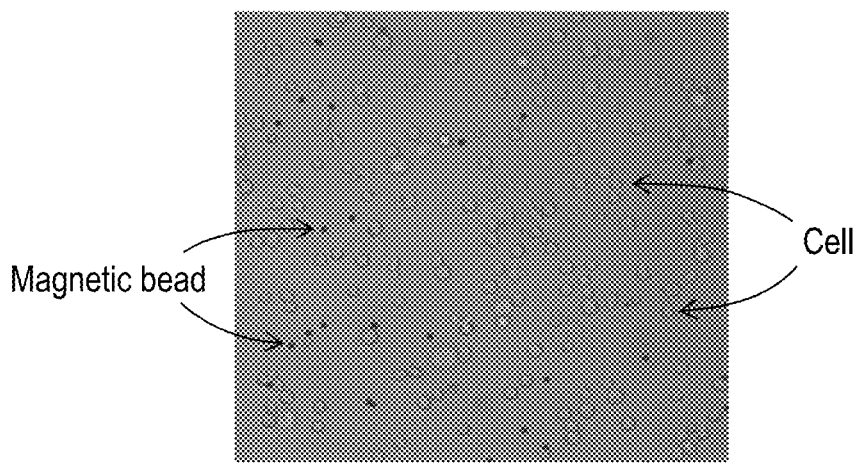
FIG. 5B is a photo taken with an optical microscope after breaking up cell clusters with the cell culture device.

Next, the situation after breaking up the cell clusters is observed with an optical microscope and photographed, and the result is shown in FIG. 5B. From the result in FIG. 5B, it may be observed that most of the magnetic beads and cells are isolated from each other. In other words, the automated cell culture device of the Example may indeed break up the cell clusters in FIG. 5A through the automated steps from Step 3 to Step 6.

Step 7: Isolating the magnetic beads: after collecting the cell solution and the magnetic beads in the hollow tank from the outlet end into the tube, a magnet is used to collect and remove the magnetic beads.

Step 8: Cell expansion: the cell solution after removing the magnetic beads is placed onto a plate, and cell culture medium is added to continue culturing for 4 days.

Step 9: After 4 days, the cell dimension, cell viability, transduction efficiency, and the number of cells are measured by an automatic cell counter (LUNA-IITM) and a spectral flow cytometry (SA3800). The results are shown in FIG. 7A to FIG. 7D.

Experimental Example 2: Using a General Manual Method to Produce CAR-T Cells Comparative Example Step 1: Cell activation: the T cell solution (about 106 cells) extracted from the blood and the magnetic beads modified with CD3 and CD28 are added onto a plate and let stand for 24 hours.

Step 2: Cell transduction: lentivirus is injected into the plate containing the cell solution and magnetic beads and let stand for 48 hours. Similar to the results in FIG. 5A, during the cell transduction process, the cells and the magnetic beads would closely attacked to form cell clusters.

Step 3: The cell clusters formed by the close attachment of cells and magnetic beads are broken up: a micropipette is used to manually suck and eject the cell solution and magnetic beads in the plate for about 20 to 30 times around the plate.

Figure 5C:
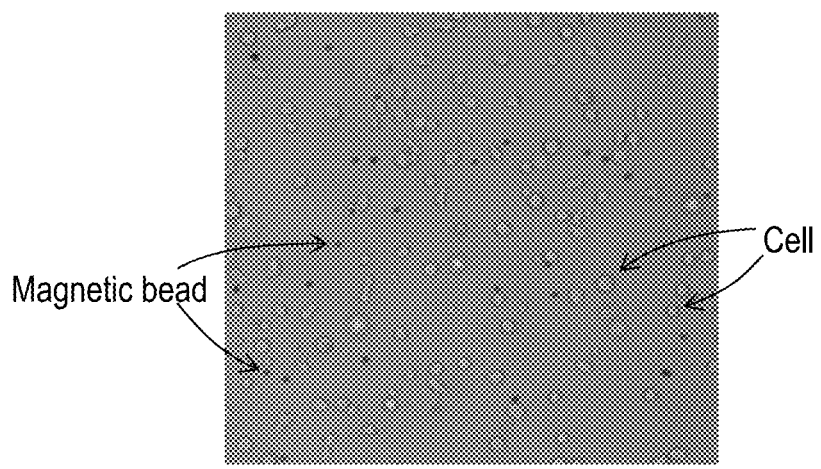
FIG. 5C is a photo taken with an optical microscope after manually breaking up cell clusters.

Next, the situation after breaking up the cell clusters is observed with an optical microscope and photographed, and the result is shown in FIG. 5C. From the result in FIG. 5C it may be observed that most of the magnetic beads and cells are isolated from each other. In other words, the cell clusters may indeed be broken up by the manual method in Step 3.

Step 4: Isolating the magnetic beads: after collecting the dispersed cell solution and the magnetic beads into the tube, a magnet is used to collect and remove the magnetic beads.

Step 5: Cell expansion: the cell solution after removing the magnetic beads is placed onto a plate, and cell culture medium is added to continue culturing for 4 days.

Step 6: After 4 days, the cell dimension, cell viability, transduction efficiency, and the number of cells are measured by an automatic cell counter (LUNA-IITM) and a spectral flow cytometry (SA3800). The results are shown in FIG. 7A to FIG. 7D.

Figure 7A:
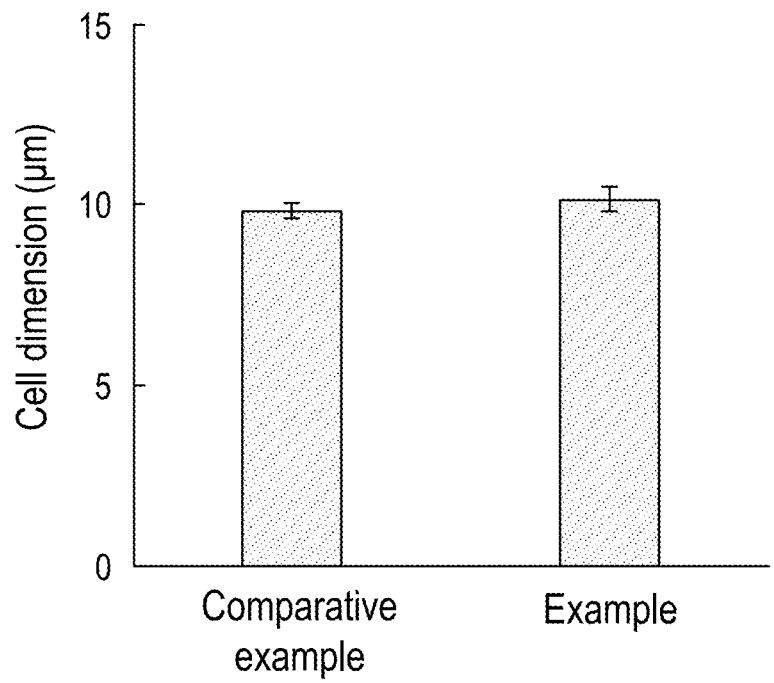
FIG. 7A is the comparison result of the cell dimension of the Example and the Comparative Example.

Experimental Example 3: Analysis of the Cell Dimension, Cell Viability, Transduction Efficiency, and Cell Expansion Factor of the Example and the Comparative Example FIG. 7A is the comparison result of the cell dimension of the Example and the Comparative Example. From the result in FIG. 7A, it may be seen that the cell dimension of the Example is about 10.1±0.3 micrometers (μm), and the cell dimension of the Comparative Example is about 9.8±0.2 μm. That is, there was no significant difference between the cell dimension of the Example and the cell dimension of the Comparative Example.

Figure 7B:
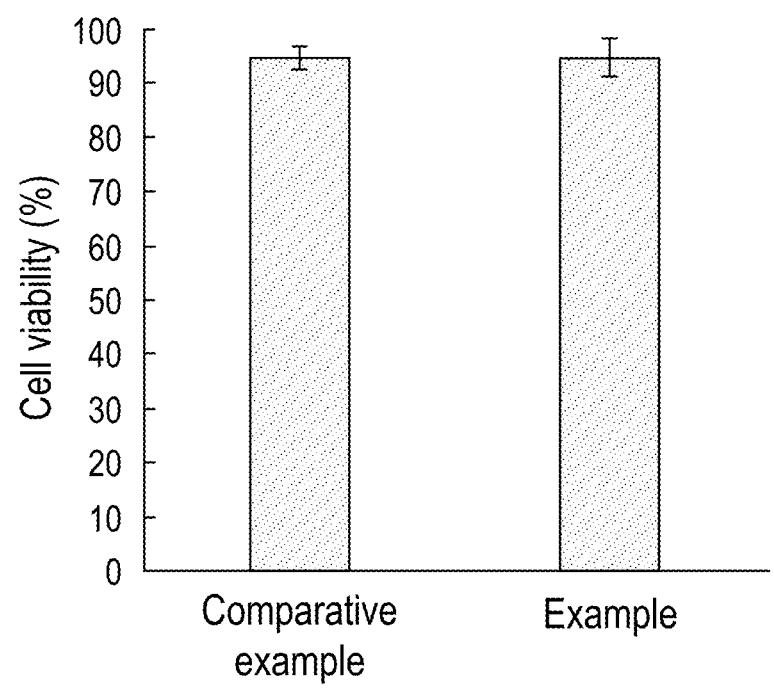
FIG. 7B is the comparison result of the cell viability of the Example and the Comparative Example.

FIG. 7B is the comparison result of the cell viability of the Example and the Comparative Example. The cell viability=the number of live cells/(the number of live cells+the number of dead cells)×100%. From the result in FIG. 7B, it may be seen that the cell viability of the Example is about 94.7±3.5%, and the cell viability of the Comparative Example is about 94.7±2%. That is, there was no significant difference between the cell viability of the Example and cell viability of the Comparative Example.

Figure 7C:
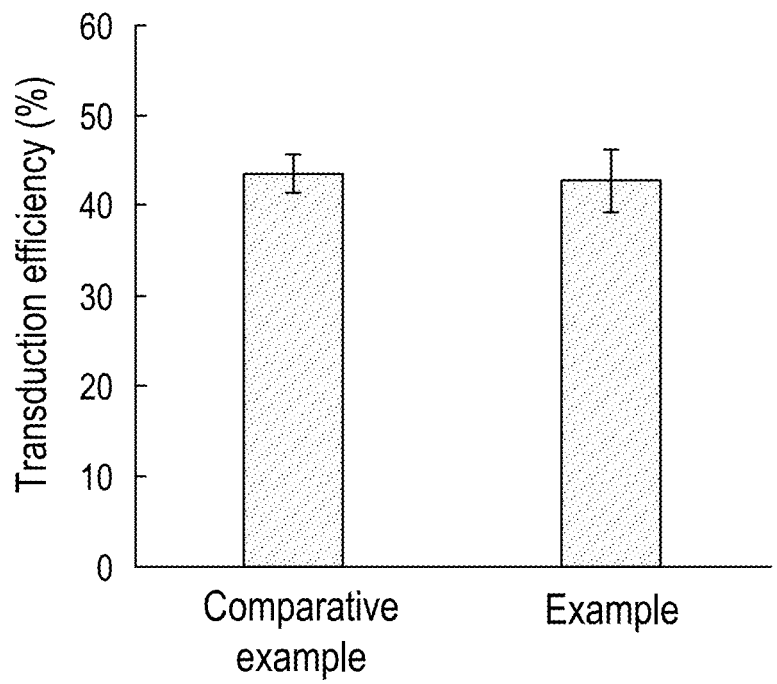
FIG. 7C is the comparison result of the transduction efficiency of the Example and the Comparative Example.

FIG. 7C is the comparison result of the transduction efficiency of the Example and the Comparative Example. The transduction efficiency=the number of CAR-T cells/(the number of CAR-T cells+the number of T cells)×100%. From the result in FIG. 7C, it may be seen that the transduction efficiency of the Example is about 43±4.1%, and the transduction efficiency of the Comparative Example is about 43±2.2%. That is, there was no significant difference between the transduction efficiency of the Example and the transduction efficiency of the Comparative Example.

Figure 7D:
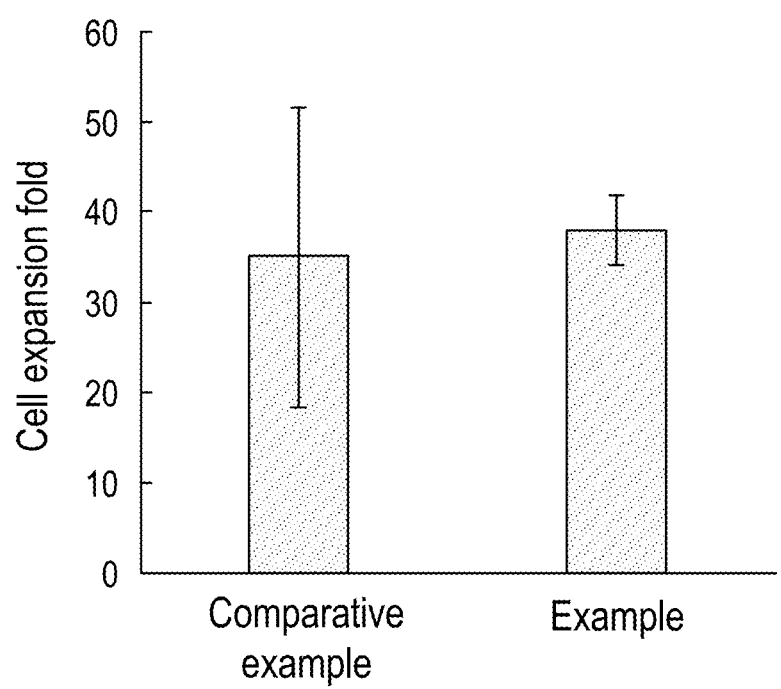
FIG. 7D is the comparison result of the cell expansion factor of the Example and the Comparative Example.

FIG. 7D is the comparison result of the cell expansion factor of the Example and the Comparative Example. The cell expansion factor=the number of CAR-T cells/(number of T cells added in Step 1)×100%. From the result in FIG. 7D, it may be seen that the cell expansion factor of the Example is about 3838±4, and the cell expansion factor of the Comparative Example is about 3535±16. That is, the cell expansion factor of the Example is larger than that of the Comparative Example. In addition, since the error value of the cell expansion factor of the Example is significantly smaller than the error value of the cell expansion factor of the Comparative Example, it may be shown that, compared with producing CAR-T cells in a general manual method in the Comparative Example, using an automated cell culture device to produce CAR-T cells in the Example may reduce operational errors, thereby improving the stability of cell products and have better reproducibility.

To sum up, in the cell culture device of an embodiment of the present invention, through the design of the rotating gear, the inclination control member, and the micro injector, an effect similar to manual operation may be provided to suck and eject the medium at different positions in the hollow tank, so that different materials in the medium (e.g., cells, magnetic beads, and/or virus) may be uniformly mixed, and cell clusters in the medium (e.g., the cell clusters formed by the close attachment of cells and magnetic beads) may be broken up. Since different materials (e.g., cells, magnetic beads, and/or virus) in the medium may be uniformly mixed, the effect of cell activation and/or cell transduction may be improved. Since the cell clusters in the medium (e.g., the cell clusters formed by the close attachment of cells and magnetic beads) may be broken up, it is possible to avoid damage or loss of cells in the subsequent step of removing the magnetic beads that reduces cell viability and/or cell expansion factor. In addition, since the cell culture device of this embodiment may be a closed device, the risk of contamination may be reduced.

Since the cell culture device of this embodiment may be an automated device, it may replace manual operations, thereby reducing errors in manual operations or improving the stability of cell products.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A cell culture device for activating, transducing, isolating, and/or expanding cells, comprising:
    a mixing tank, wherein the mixing tank comprises:
        a first support;
        a hollow tank, disposed on the first support and has a first opening, a second opening, and an accommodating space; and
        a cover, covering the second opening and has a first hole, an inlet end, and an outlet end; and
    a rotary control platform, wherein the rotary control platform comprises:
        a base;
        a second support, disposed on the base;
        a rotating gear, fixed on the second support;
        an inclination control member, having a first part, a second part, and a third part, wherein the first part is connected to the rotating gear, and the second part is connected to the first part and the third part; and
        a micro injector, extending to the accommodating space through the first hole of the cover, wherein the micro injector has a top end and a bottom end, the top end is fixed on the third part, and the bottom end is disposed on a bottom of the accommodation space, wherein the micro injector is inclined towards the bottom of the accommodating space through an adjustable angle between the first part and the second part; and
    wherein the first support has a support member and a gas-permeable film, the support member has a plurality of micropores arranged in an array, the gas-permeable film is disposed between the hollow tank and the support member, and the gas-permeable film covers the first opening of the hollow tank.

2. The cell culture device according to claim 1, wherein the gas-permeable film has pores with diameter of 0.1 micron to 0.3 micron, and a thickness of the gas-permeable film is 50 microns to 500 microns.

3. The cell culture device according to claim 1, wherein a number of the plurality of micropores is 40 to 60 and the plurality of micropores have pores with diameter of 1 mm to 2 mm.

4. The cell culture device according to claim 1, wherein the mixing tank further comprises: a first pipeline, connected to the inlet end and extending to a top of the accommodating space; a second pipeline, connected to the outlet end and extending to the bottom of the accommodation space; a silicone sheet, disposed between the cover and the hollow tank, covering the second opening and has a second hole; a first sealing member, disposed at a joint between the hollow tank and the first support; and a second sealing member, disposed at a joint between the cover and the hollow tank, wherein the micro injector extends to the accommodating space through the second hole of the silicone sheet.

5. The cell culture device according to claim 1, wherein a rotation angle of the rotating gear is 0° to 360°.

6. The cell culture device according to claim 1, wherein the rotary control platform further comprises: a motor, disposed on the second support and driving the rotating gear; and a pump, having a third pipeline, wherein the third pipeline is connected to the top of the micro injector through the third part of the inclination control member.

7. The cell culture device according to claim 1, wherein an inclination angle between an extending direction of the micro injector and a horizontal surface of the first support is 30° to 85°.

8. The cell culture device according to claim 1, wherein a first width of the top end of the micro injector is larger than a second width of the bottom end of the micro injector.

9. The cell culture device according to claim 8, wherein a ratio of the first width to the second width is 5:1 to 8:1.

* * * * *